(12) United States Patent
Tomlin et al.

(10) Patent No.: US 12,003,950 B2
(45) Date of Patent: Jun. 4, 2024

(54) ENVIRONMENTAL CONDITION BASED SPATIAL AUDIO PRESENTATION

(71) Applicant: Microsoft Technology Licensing, LLC, Redmond, WA (US)

(72) Inventors: Arthur Charles Tomlin, Kirkland, WA (US); Kendall Clark York, Bellevue, WA (US); Jeffrey Sipko, Kirkland, WA (US); Adolfo Hernandez Santisteban, Bothell, WA (US); Aaron Daniel Krauss, Snoqualmie, WA (US); Andrew Frederick Muehlhausen, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/660,671

(22) Filed: Apr. 26, 2022

(65) Prior Publication Data

US 2022/0256304 A1  Aug. 11, 2022

Related U.S. Application Data

(63) Continuation of application No. 16/884,284, filed on May 27, 2020, now Pat. No. 11,343,633, which is a continuation of application No. 15/922,791, filed on Mar. 15, 2018, now Pat. No. 10,694,311.

(51) Int. Cl.
*H04S 7/00* (2006.01)
*G06F 3/16* (2006.01)
*H04S 3/00* (2006.01)

(52) U.S. Cl.
CPC .............. *H04S 7/303* (2013.01); *G06F 3/165* (2013.01); *H04S 3/008* (2013.01); *H04S 2400/01* (2013.01); *H04S 2400/11* (2013.01); *H04S 2420/01* (2013.01)

(58) Field of Classification Search
None
See application file for complete search history.

(56) References Cited

U.S. PATENT DOCUMENTS

2013/0236040 A1* 9/2013 Crawford ................ H04S 7/306
381/310

FOREIGN PATENT DOCUMENTS

EP   1341398 A1   9/2003

OTHER PUBLICATIONS

"Office Action Issued in European Patent Application No. 19712452.2", dated May 23, 2022, 8 Pages.

* cited by examiner

*Primary Examiner* — Mark Fischer

(57) ABSTRACT

A wearable spatial audio device is provided. The wearable spatial audio device includes one or more audio speakers, one or more processors, and a storage machine holding instructions executable by the one or more processors. Map data is obtained for a real-world environment that includes one or more dynamic audio objects. A device-specific subset of audio tracks is obtained, and a device-specific spatialized audio mix of the device-specific subset of audio tracks that is based on the map data is obtained. An indication of a change in an environmental condition relative to one or more of the dynamic audio objects is received. The device-specific spatialized audio mix is adjusted based on the change in the environmental condition.

20 Claims, 8 Drawing Sheets

ENVIRONMENTAL CONDITION BASED SPATIAL AUDIO PRESENTATION

CROSS REFERENCE TO RELATED APPLICATIONS

This application is a continuation of U.S. patent application Ser. No. 16/884,284, filed May 27, 2020, which is a continuation of U.S. patent application Ser. No. 15/922,791, filed Mar. 15, 2018, which is now Issued U.S. Pat. No. 10,694,311, and which applications are incorporated herein by reference in their entireties. To the extent appropriate, a claim of priority is made to both applications.

BACKGROUND

Multi-media systems may enable customized audio profiles for users. For example, a user may select formats, channels, languages, etc. to customize their listening experience based on their use environment, speaker or headphone type and configuration, and other personal preferences. Spatial audio systems allow for users to experience surround or 3D audio without purchasing and arranging costly stereo systems with numerous speakers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A wearable spatial audio device is provided. The wearable spatial audio device includes one or more audio speakers, one or more processors, and a storage machine holding instructions executable by the one or more processors. Map data is obtained for a real-world environment that includes one or more dynamic audio objects. A device-specific subset of audio tracks is obtained, and a device-specific spatialized audio mix of the device-specific subset of audio tracks that is based on the map data is obtained. An indication of a change in an environmental condition relative to one or more of the dynamic audio objects is received. The device-specific spatialized audio mix is adjusted based on the change in the environmental condition.

DETAILED DESCRIPTION

Spatial audio systems enable the creation of an immersive acoustic experience around a user using a pair of headphones or outboard speakers. By way of filters and head related transfer functions (HRTFs), multi-channel audio may be presented to a user such that the user perceives sound as coming from all directions, including above and below the user as well as in front, behind, and to the sides. Spatial audio may be used to simulate the location, direction, and proximity of one or more sound sources.

Spatial audio systems thus enable the creation of a surround or 3D sound experience without purchasing, installing, and arranging numerous speakers. However, the use of spatial audio may make it more challenging to create a shared audio experience for multiple users within a single environment. For example, two users may each have their own, different, wearable spatial audio output devices. If both users are provided the same spatialized audio feed, the differences in output devices and other factors such as user physiology may lead to inconsistencies in audio presentation.

Further, the users will not have the shared experience of true surround sound, where one user is closer to some speakers and the other user closer to other speakers, or where the acoustics of the environment are non-uniform. Additionally, users may prefer to receive different audio tracks altogether. For example, two users each may desire to watch a movie in their own native language.

Thus, examples are disclosed that relate to providing a shared spatial audio experience for multiple users within an environment, each having their own wearable spatial audio output device. Sounds for the audio experience are customized and spatialized for each user. Audio tracks provided to each user may be selected based on a user profile and/or user preferences. In some examples, the selected audio tracks may then be mixed specifically for each user. The wearable spatial audio output devices may relay positional information in the form of a shared map, thus enabling the mix for each user to change as they adjust their position, or as the position of another user changes. Additional audio tracks may be triggered by one or more users and mixed specifically for each user. In this way, multiple users may have a shared audio experience that is both dynamic and synchronized.

Figure 1:
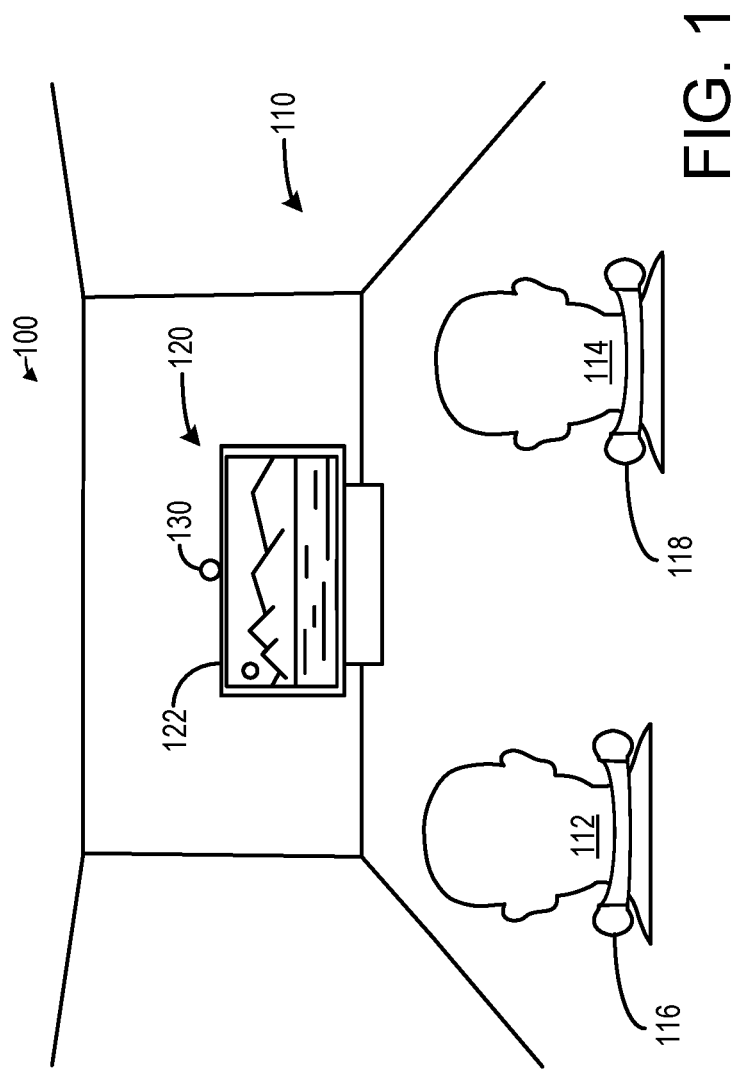
FIG. 1 shows a schematic depiction of an example use environment for a spatialized audio system.

FIG. 1 shows a schematic depiction of an example use environment 100 for a spatialized audio system 110. In this example, environment 100 is depicted as being in the form of a room, but may take any other suitable form. In this example, environment 100 includes a first user 112 and a second user 114. Users 112 and 114 are depicted wearing wearable spatial audio output devices 116 and 118, respectively. Wearable spatial audio output devices 116 and 118 are depicted having a neck-worn form, though any other suitable form, such as headphones, also may be used within the scope of this disclosure.

Spatial audio system 110 includes one or more dynamic audio objects 120, such as display device 122. Display device 122 may be included in a television, a gaming system, a stereo system, and/or any other suitable computing system. As described further herein, dynamic audio objects may take the form of any object, real or virtual, that is located at a position within environment 100 and associated with a set of audio tracks. Dynamic audio objects 120 may include visible objects, including objects featuring one or more dynamic visuals (e.g., video, animated virtual objects, animatronic objects), and/or invisible objects. Although FIG. 1 shows a single display device 122, in other examples, environment 100 may include a plurality of dynamic audio objects positioned at different locations in the environment or a plurality of devices may be included in a single system, e.g., a television with an attached or integrated game console.

Spatial audio system 110 optionally includes a sensor system 130 configured to track one or more users in environment 100 and provide data suitable for tracking positions of users in environment 100. Sensor system 130 may include any suitable sensing devices, including but not limited to one or more of a depth camera, an IR image sensor, a visible light (e.g. RGB) image sensor, and an acoustic sensor such as a directional microphone array.

Based on data received from sensor system 130, positional information of users 112 and 114 may be determined and tracked in real-time. Examples of positional information of a user which may be tracked include location of a user or a portion of a user, e.g., a user's head, orientation of a user or a portion of a user, e.g., a user's head, posture of a user or a portion of a user, e.g., a user's head or a body, and user gestures. Further, sensor system 130 may be used to parameterize various features of environment 100 including a size of the environment, a layout of the environment, geometry of the environment, objects in the environment and their relative positions to user 106, textures of surfaces in the environment, etc.

Figure 2:
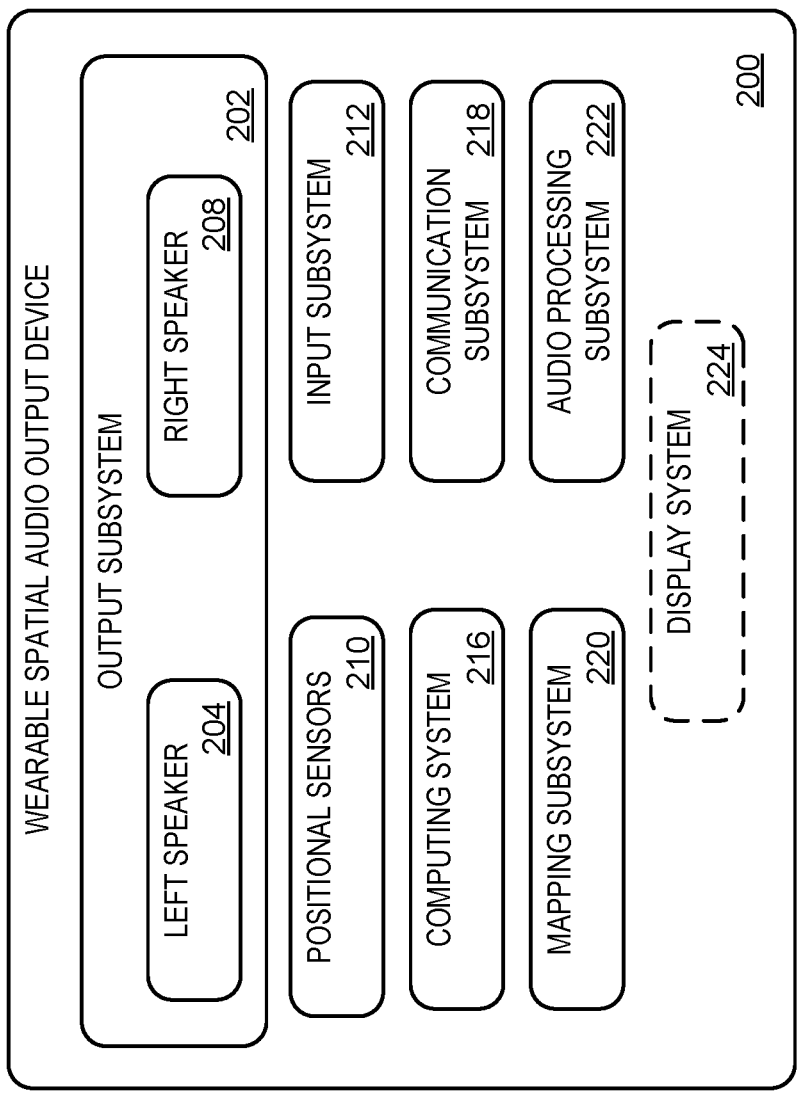
FIG. 2 schematically shows a wearable spatial audio output device.

Sensor system 130 is depicted as being associated with display device 122. However, some or all of the elements of sensor system 130 may be included in wearable spatial audio output devices 116 and 118. FIG. 2 schematically shows an example wearable spatial audio output device 200. Wearable spatial audio output device 200 may be considered an example of wearable spatial audio output devices 116 and 118. Wearable spatial audio output device 200 also may take the form of headphones, a head-mounted display, or any other suitable wearable device.

Wearable spatial audio output device 200 includes output system 202 including left and right spatial audio output speakers 204 and 208. As described with regard to FIG. 1, speakers 204 and 208 may be open-air speakers. In other examples, speakers 204 and 208 may be included in headphones. Although two spatial audio output speakers are indicated, some examples may include one speaker, or may include three or more speakers. Output system 202 may further include one or more haptic output mechanisms.

Wearable spatial audio output device 200 further includes positional sensors 210. Positional sensors 210 may include an inertial measurement unit (IMU) that includes one or more accelerometers, one or more gyroscopes, and/or or more magnetometers. Positional sensors 210 further may include location sensors such as GPS sensors. Positional sensors 210 may generate positional information regarding wearable spatial audio output device 200 that is absolute and/or relative to one or more established objects or positions within an environment.

In addition to positional sensors 210, wearable spatial audio output device 200 may obtain positional information via input subsystem 212. Input subsystem 212 may include one or more cameras, such as visible light cameras, IR and/or near-IR cameras which may be included in a depth camera or other image-based depth sensing systems. Input subsystem 212 may further include one or more inward-facing cameras, such as eye-tracking cameras (where device 200 is a head-mounted display device). Input subsystem 212 may further include one or more microphones and/or microphone arrays, acoustic depth sensing systems (e.g., sonar), and/or one or more additional input devices.

Wearable spatial audio output device 200 also includes a computing system 216, which may include a logic machine and a storage machine, among other components. A more detailed description of an example computing system is presented herein with regard to FIG. 8.

Positional sensors 210, along with input subsystem 212, and/or external sensors, such as sensor system 130 may enable natural user interface (NUI) tracking-based feedback that may be used to track positions of one or more users in an environment, and audio signals provided to speakers 204 and 208 may be varied based upon the position of the user(s) in the environment. A natural user interface system may be able to determine such positional information as a location of a user in an environment, an orientation of the user in the environment, a head position of the user, gestural and postural information, and gaze direction and gaze focus location.

Wearable spatial audio output device 200 further includes a communication subsystem 218, configured to communicatively couple wearable spatial audio output device 200 with one more other computing devices, spatial audio output devices, etc.

Positional sensors 210, along with input subsystem 212, and/or external sensors, such as sensor system 130 may enable wearable spatial audio output device 200 to determine and characterize various features of an environment, such as a size of the environment, a layout of the environment, geometry of the environment, locations and configurations of objects in the environment, textures of surfaces in the environment, etc. Such information may be processed by mapping subsystem 220. Such mapping information then may be used by audio processing subsystem 222 to dynamically adapt sound fields provided to users in an environment in order to provide an enhanced listening experience. Mapping subsystem 220 may also specifically determine obstructions in a sound field so that the sound field presented to users in the environment are adapted or modified to compensate for the identified obstructions. For example, if a person is standing in a path of the sound field for another user, the sound field presented to the user may be adapted so that it seems like the person is not there, or may be adapted to occlude the obstructed sound field. Mapping subsystem 220 may further enable the sharing of mapping information between devices, and the generation of shared maps using the shared mapping information. Mapping subsystem 220 also may facilitate communication between wearable spatial audio output device 200 and a central mapping server, allowing for the downloading of established maps, updating of previously shared maps, etc.

Audio processing subsystem 222 may dynamically adjust the mix of audio tracks delivered to left and right speakers 204 and 208. For example, an HRTF may be applied to the audio signals sent to left and right speakers 204 and 208 in order to position the sounds associated with a dynamic audio object at a location behind and to the left of a user. As another example, as a user is facing away from a display device configured as a dynamic audio object, the volume of audio associated with content presented on the display device may be reduced or muted. As used herein, the term "HRTF" may include any suitable audio path transfer function applied to audio signals based on user position. As one non-limiting example, HRTF's may be used to determine what a user's left and right ear would receive in the direct paths from some sound source at some position from the user's head. As another non-limiting example, an environment of the user, e.g., a room (real or virtual) within which the user is positioned, may be modeled and echo paths based on objects in the environment may be added to the sound sources.

Optionally, wearable spatial audio output system 200 may include a display subsystem 224, such as a near-eye, see-through display. This may enable wearable spatial audio output system 200 to present virtual objects that appear to be embedded within an environment. The virtual objects may be configured as dynamic display objects, and associated with one or more audio tracks. Audio presented as associated with such virtual objects may be configured so that the audio spatially matched the virtual position of the virtual object.

Figure 3:
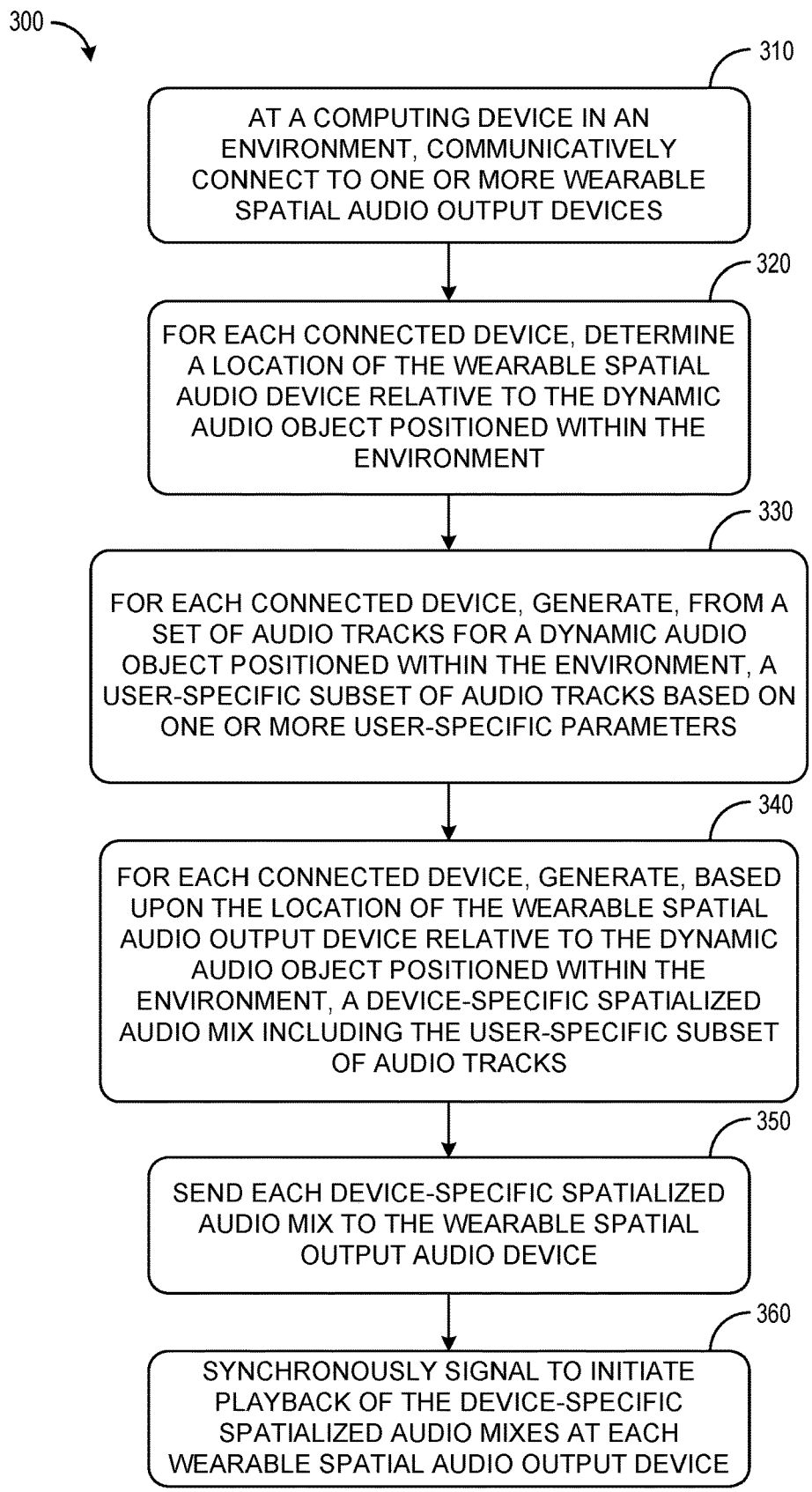
FIG. 3 shows an example method for presenting spatialized audio to two or more users within an environment.

FIG. 3 shows an example method 300 for presenting spatialized audio to two or more users within an environment. Method 300 may be executed by any suitable computing device, such as a wearable spatial audio output device, a spatial audio system, a gaming device, a head mounted display, a tablet, laptop, or desktop computer, a mobile device, etc. Method 300 may enable multiple users to consume media while having a spatial audio experience that is synchronized, shared, and individualized. In one example described herein, two people watch a movie in an environment where surround sound speakers are not installed.

At 310, method 300 includes, at a computing device in an environment, communicatively connecting to one or more wearable spatial audio output devices. For example, referring to FIG. 1, wearable spatial audio output device 116 may communicatively connect to wearable spatial audio output device 118 and one or more additional wearable spatial audio output devices. One or both of devices 116 and 118 may connect to one or more of sensor system 130, display screen 122, dynamic audio object 120, etc.

Communicatively connecting to one or more wearable spatial audio output devices may include establishing a connection between the respective communications subsystems of two or more wearable spatial audio output devices (e.g., communications subsystem 218 of wearable spatial audio output device 200). Communicatively connecting to one or more wearable spatial audio output devices may further include receiving input from a user indicating to initiate a shared spatial audio experience. For example, user 112 may issue a command (e.g., NUI input, such as a verbal or gesture command) to initiate playback of a movie. The command will trigger wearable spatial audio output device 116 to communicatively connect to wearable spatial audio output device 118, and optionally to dynamic audio object 120.

At 320, method 300 includes, for each wearable spatial audio output device communicatively connected to the computing device, determining a location of the wearable spatial audio output device relative to a dynamic audio object positioned within the environment. For example, this may include receiving positional information of wearable spatial audio output devices in the environment, of users in an environment and of the dynamic audio object.

Receiving positional information may include receiving depth image data capturing one or more wearable spatial audio output devices in the environment, and/or other suitable sensor data, and determining the positional information from the sensor data. The positional information may indicate one or more of a location, an orientation, a gesture, a posture, and a gaze direction or location of focus of one or more users in the environment. As a more specific non-limiting example, a depth camera may be used to determine a user's head position and orientation in 3-dimensional space, in order to approximate the positions of a user's ears.

Additionally, environmental characteristics data may be received. For example, depth images from a depth camera may be used to determine and parameterize various features or characteristics of an environment. Example characteristics of an environment which may be determined include, but are not limited to, size, geometry, layout, surface location, and surface texture.

The position of the dynamic audio object within the environment may be determined based on data collected by one or more wearable spatial audio output devices, one or more additional sensor systems (e.g., sensor system 130), or provided from the dynamic audio object itself. As will be described further herein, the dynamic audio object may be a virtual dynamic audio object, and thus may be embodied in code stored at the storage machine of one or more of the wearable spatial audio output devices.

Based on the received positional information and environmental characteristics data, the location of each wearable spatial audio output device may be determined relative to any dynamic audio objects within the environment, relative to other wearable spatial audio output devices, and relative to any determined environmental characteristics.

At 330, method 300 includes, for each wearable spatial audio output device communicative connected to the computing device, generating, from a set of audio tracks for a dynamic audio object positioned within the environment, a user-specific subset of audio tracks based on one or more user-specific parameters.

The audio tracks may be associated with any suitable data that allows for synchronization across two or more devices. As one example, the audio tracks may be appended to one or more data structures indicating a relative time of the track at certain intervals, such as a time-stamp. Each time-stamped audio track for a dynamic audio object may thus be able to be cued at a particular time-stamp. Parsing time-stamped audio tracks for a dynamic audio object may thus allow for synchronization among wearable spatial audio output devices. For example, a movie may be accompanied by a plurality of time-stamped audio tracks. The video components for the movie may also be associated with time-stamps or other suitable data to allow for synchronization to the audio tracks.

Each user may specify, be it actively, through pre-determined user-preferences, or otherwise, a preferred language for the movie dialogue. Audio tracks in the preferred language may then be added to the user-specific subset of audio tracks, while audio tracks in other, non-preferred languages are not added to that particular user-specific subset. Parents of children and others who prefer not to hear course language may select an experience for themselves or their children where audio tracks that have been censored, overdubbed, or otherwise edited are added to the user-specific subset of audio tracks. In some examples, a user may specify a preferred type of music for the movie soundtrack.

The configuration of each wearable spatial audio output device may determine the total number of audio tracks that can simultaneously be played back by the output system for the device. For example, some devices may be configured to simulate 5.1 surround sound profiles, while others are configured to output full 3D sound with 30 or more tracks. A user may set a preferred mix profile, and thus those audio tracks will be added to the user-specific subset, while additional tracks are excluded. In some examples, a group of users may elect to all use the same surround sound profile, even if some users have devices capable of emitting higher density profiles.

In some examples, one or more open-air speakers may be associated with the dynamic audio object (provided the dynamic audio object is a tangible object) and thus shared among the users in the environment. Thus, each user-specific subset of audio tracks may exclude tracks and/or channels that will emanate from speakers accompanying the dynamic audio object.

At 340, method 300 includes, for each wearable spatial audio output device communicative connected to the computing device, generating, based upon the location of the wearable spatial audio output device relative to the dynamic audio object positioned within the environment, a device-specific spatialized audio mix including the user-specific subset of audio tracks. Generating a device-specific spatialized audio mix may include coding the audio tracks for spatial sound, and/or processing the audio tracks via one or more filters, HRTFs, SLAM algorithms, etc.

The sound signals comprising the spatialized audio mix may be determined in any suitable manner. For example, in some embodiments, a first HRTF may be applied to audio signals based upon positional information of the user. The first HRTF may be determined, for example, by locating the HRTF in a look-up table of HRTFs based upon the positional information. A user location, orientation, posture, or other positional information may be utilized to determine a gain, delay, and/or other signal processing to apply to one or more audio signals. In some examples, a user's physiological information may be used to determine an HRTF (e.g., distance between collar bones and ears, distance between ears, etc.).

In some examples, each device-specific spatialized audio mix may be generated based on a single set of virtual channels (or virtual speakers) placed within the environment. As an example, 7.1 surround mixes may be generated as if the speakers and subwoofers were placed in one position within the environment for all users. Each user's device-specific spatialized audio mix may then be determined based on a distance between the wearable spatial audio output mix and the virtual speakers.

In other examples, each device-specific spatialized audio mix may be generated based on a user-specific set of virtual channels (or virtual speakers) placed within the environment. As an example, the device specific spatial audio mixes may place each user at the center of the virtual speaker array, and/or may be adjusted based on the position of the user relative to the dynamic audio object.

At 350, method 300 includes, sending the device-specific spatialized audio mix to the wearable spatial output audio device. In some examples, the audio tracks may be stored and processed at a central server, and then streamed to each wearable spatial audio output device. Alternatively, the audio tracks may be stored and processed individually at each wearable spatial audio output device. In some examples, one wearable spatial audio output device may act as a master device, disseminating audio tracks and/or audio processing information to other wearable spatial audio output devices (slave devices). Additionally or alternatively, a user-specific subset of audio tracks may be sent to each wearable spatial audio output device for local generation of a device-specific spatialized audio mix.

At 360, method 300 includes, synchronously signaling to initiate playback of the device-specific spatialized audio mixes at each wearable spatial audio output device. Signaling to initiate playback may include sending a command to each wearable spatial audio device, and/or to each dynamic audio object. Playback may be initiated based on user input. For, example, one device may trigger playback, and may also communicate to the other devices to initiate playback at the same time. In some examples, the user input may be the same user input that initiated communicative coupling between wearable spatial audio devices. In some examples, a prompt may be issued to one or more users once all device-specific spatialized audio mixes have been completed and are ready for playback. A user input may be required to initiate playback responsive to the prompt, or playback may initiate automatically following a duration, which may be visually or acoustically rendered to one or more users (e.g., a countdown). Playback of the device-specific spatialized audio mixes may be synchronized with playback of any video or other visual components to the dynamic audio object.

Once playback has been initiated, the device-specific spatialized audio mixes may be updated, for example based on determining a change in location of the wearable spatial audio output device relative to the dynamic audio object positioned within the environment, and/or based on recognizing a change in conditions within the environment.

During playback, a user may move about an environment, change head orientation, gaze direction, etc., and realize spatialization changes to mimic a surround (or 3D) sound speaker installation based on tracking the position of the wearable spatial audio output device in the environment. Further, a user may be presented with positional sounds that are unique to an individual's location in the environment relative to a dynamic display object, such that the sound is presented differently to users at other locations, or not presented at all to a user at a different location. Although this provides an individualized element to a user's spatialized audio mix, the combined shared experience with other users still occurs, as each user's device-specific spatialized audio mix is synchronized to the others.

As a more specific example, device-specific spatialized audio mix may be adjusted in real-time as a user moves about the environment, closer to some virtual speakers and further from other virtual speakers. Adjusting a device-specific spatialized audio mix may include adjusting one or more HRTFs applied to one or more audio tracks, adjusting the frequency space for one or more audio tracks, etc. The adjusted device-specific spatialized audio mix may be generated at the wearable spatial audio device if the subset of device-specific audio tracks are stored locally, or may be processed at a central server and a pre-mixed version sent to the wearable spatial audio device.

Recognizing a change in conditions within the environment may include, for example, recognizing a change in the acoustic properties of the environment, such as opening or closing doors, people, animals, or objects entering or leaving the room, curtains being open or closed, etc. Changes in the environment may be recognized in any suitable manner, such as by receiving information from one or more sensor systems (e.g. image and/or acoustic sensors) that indicate that the environment has changed. A device-specific spatialized audio mix may be generated to compensate, enhance, or otherwise take into account the changes in environmental conditions.

In some examples, the sensor system (e.g., sensor system 130) may determine a location or direction of the user's gaze or focus, e.g., based on a head orientation of the user, a body posture of the user, eye-tracking data, or any other suitable data obtained via the sensor system. A device-specific spatialized audio mix may be modified based on the user's gaze or focus.

Further, in some examples, different sounds within a device-specific spatialized audio mix may be emphasized depending upon a location at which a user is gazing on a single display showing a single screen of content to highlight sounds associated with the object displayed at that location on the screen. For example, if a user is watching concert footage, a volume of drums in the mix may be increased if the user is gazing at a drummer displayed on the display.

In some examples, a user may adjust the playback of a dynamic audio object. For example, a user may provide a command (e.g., via NUI gesture, spoken command, input device) indicating for playback of the dynamic audio object to stop, pause, fast-forward, reverse, skip to a chapter or bookmark, etc. The command may be provided to all wearable spatial audio output devices, causing audio playback to mirror playback of the dynamic audio object. In some examples, carrying out the command may be based on one or more time-stamps of the audio tracks and/or video tracks associated with the dynamic audio object. All tracks may remain synchronized throughout the commanded operation, and/or all tracks may be aligned prior to re-initiating playback following the commanded operation.

In some examples, updating the device-specific spatialized audio mix may include updating the device-specific spatialized audio mix based on determining a change in location of one or more other wearable spatial audio output devices relative to the dynamic audio object positioned within the environment. For example, user 112 may remain stationary while user 114 and wearable spatial audio output device 118 move across environment 100. User 114 may move in the path between user 112 and one or more virtual speakers. In response, user 112 may experience attenuation of those speaker channels. If user 112 and user 114 are sharing a set of virtual speakers, the virtual speakers may be configured to expand or contract the surround sound footprint based on movement of either user. For example, as the users move closer together, the surround footprint may shrink, bringing the virtual speakers closer to the users. If the users move apart, the surround footprint may expand, bringing the virtual speakers further from the users. Audio signals sent to the wearable spatial audio output devices may be adjusted accordingly.

To aid in tracking user (and wearable spatial audio output device) movement, relative to other users, relative to dynamic audio objects, and relative to an environment, a spatial audio system may employ a shared mapping system. Each user with a wearable spatial audio output device may move about an environment and obtain individualized information about the environment. This obtained information may be used in building a personalized map. Such personalized maps may be shared with other devices in the environment. In this way, people may more effectively collaborate in a shared space where mapping information matters to the task at hand. Further, shared maps may aid people who are sight impaired navigate a space using spatial sound.

Figure 4A:
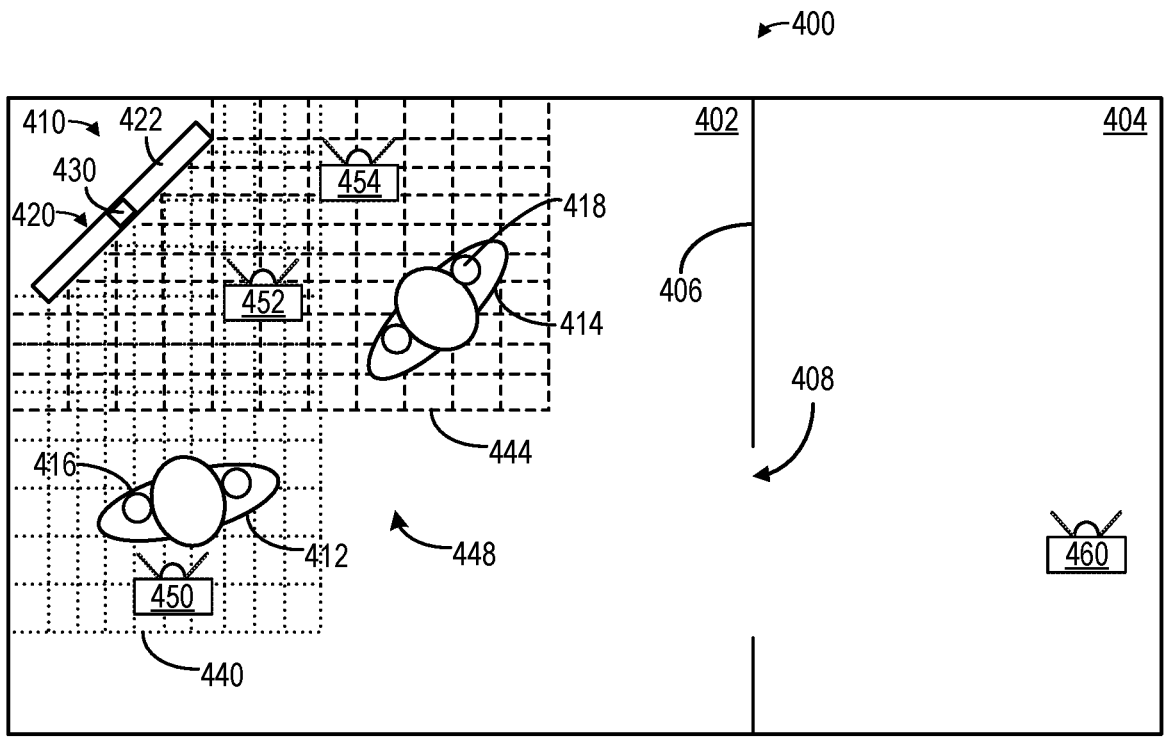
FIGS. 4A-4B show a schematic depiction of an example use environment for a spatialized audio system featuring shared maps.
Figure 4B:
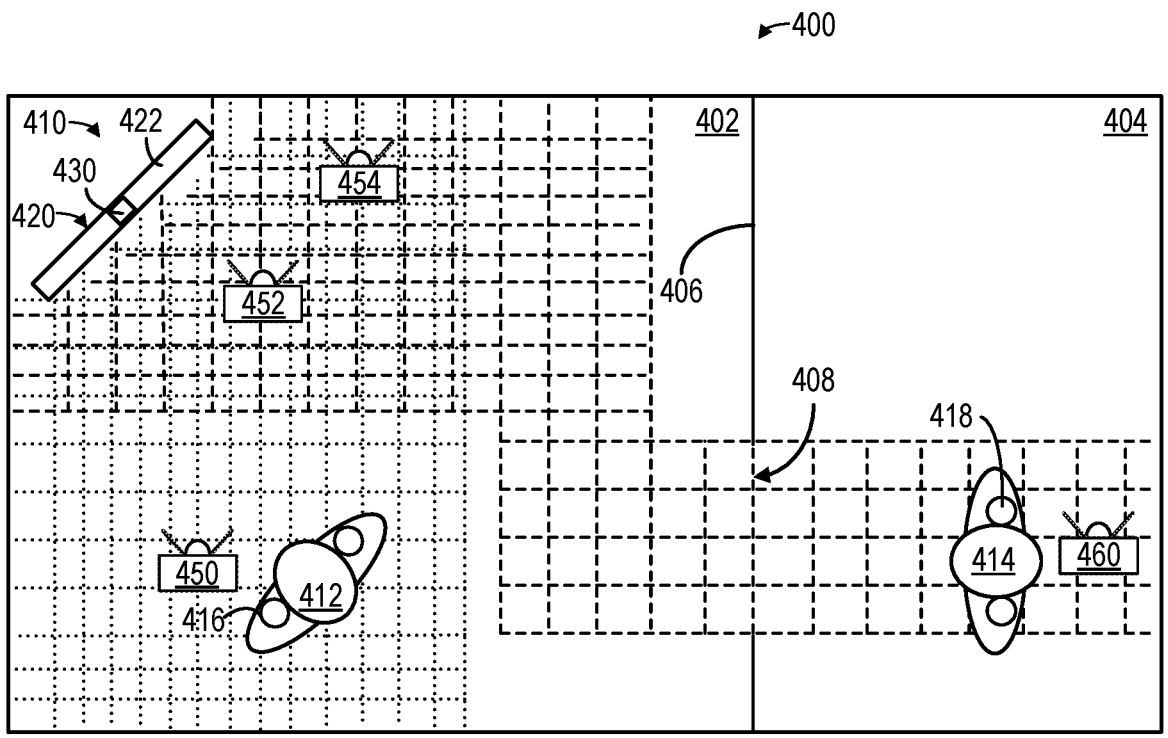

FIGS. 4A and 4B show a schematic depiction of an example use environment 400 for a spatialized audio system featuring shared maps. Environment 400 includes a first room 402 and a second room 404. First room 402 and second room 404 are separated by wall 406 and adjoined by door 408. Spatialized audio system 410 operates within environment 400. In this example, environment 400 includes a first user 412 and a second user 414. Users 412 and 414 are depicted wearing wearable spatial audio output devices 416 and 418, respectively. Spatial audio system 410 includes one or more primary dynamic audio objects 420, such as display device 422. Spatial audio system 410 further includes sensor system 130.

As shown in FIG. 4A, user 412 has generated a first map 440 (shown in dotted lines), via wearable spatial audio output device 416 and/or sensor system 130. User 414 has generated a second map 444 (shown in dashed lines), via wearable spatial audio output device 418 and/or sensor system 130. Wearable spatial audio output devices 416 and 418 may share map data via their respective communications subsystems, yielding shared map 448.

Shared map 448 allows for each wearable spatial audio output device 416 and 418 to have a more detailed picture of environment 400 than either would alone. This may allow for more nuanced spatial audio mixes to be generated for each user, and may further allow for more realistic rendering of dynamic audio objects within environment 400. Devices 416 and 418 may each generate maps 440 and 444 in any suitable manner, such as via simultaneous mapping and location (SLAM) algorithms.

Figure 5:
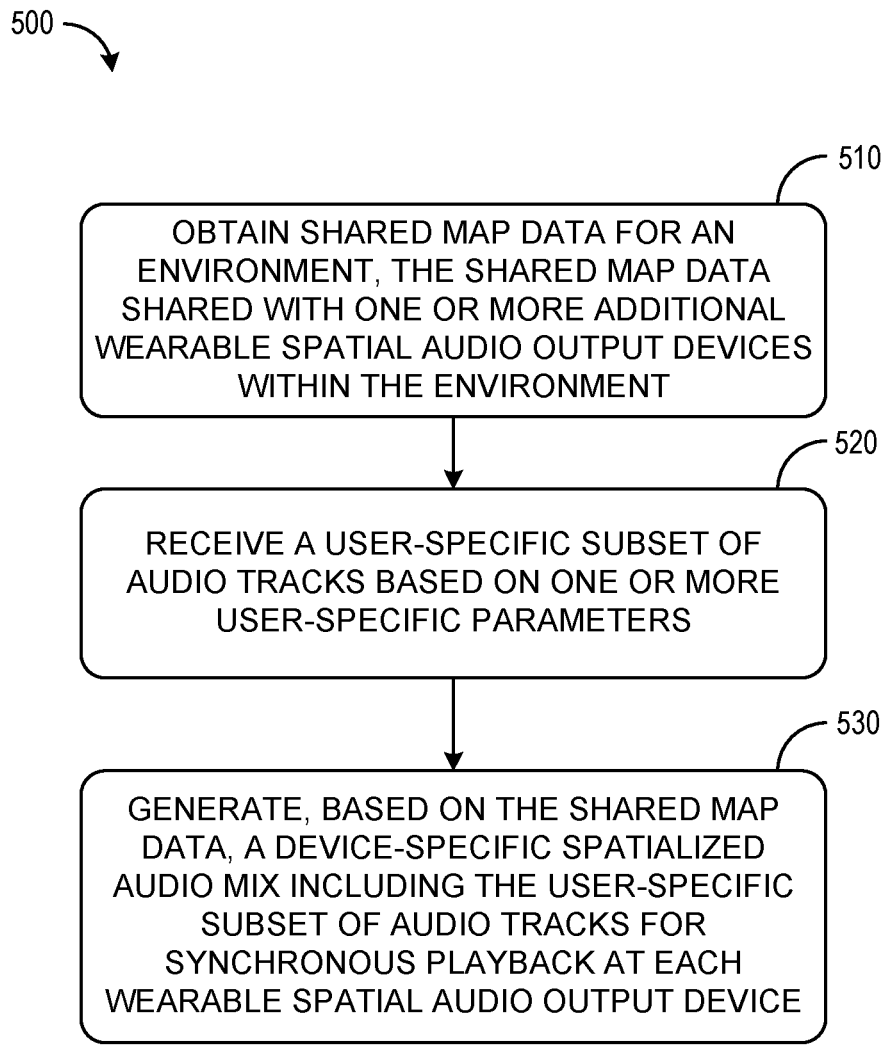
FIG. 5 shows an example method for presenting spatialized audio to two or more users based on shared map data.

FIG. 5 shows an example method 500 for presenting spatialized audio to two or more users based on shared map data. Method 500 may be executed by a computing device, such as a wearable spatial audio output device, a spatial audio system, a gaming device, a head mounted display, a tablet, laptop, or desktop computer, a mobile device, etc. Method 500 may enable multiple users to share individualized maps of an environment in order to render a spatial audio experience. In one example described herein, two people are engaged in game play that involves dynamic audio objects placed throughout an environment.

At 510, method 500 includes obtaining shared map data for an environment, the shared map data provided to one or more additional wearable spatial audio output devices within the environment. As shown in FIG. 4A, wearable spatial audio output device 416 may share first map 440 with wearable spatial audio output device 418, and wearable spatial audio output device 418 may share second map 444 with wearable spatial audio output device 416. Each device may then synthesize shared map 448. The map data may include data pertaining to each user, the environment, objects within the environment (including dynamic audio objects), etc. Map data may be generated by the wearable spatial audio output device, by an external sensor system, etc. Map synthesis may be performed at each wearable spatial audio output device (e.g., using a subsystem such as mapping subsystem 220), by a central server, or by one designated wearable spatial audio output device.

Based on the shared map information, the wearable spatial audio output devices may recognize where the other wearable spatial audio output devices are within the environment and/or relative to one another. Map data may be shared continuously, at regular intervals, as new data above a threshold is added to one or more individual maps, on-demand, etc. Each individual map may dynamically change as any user moves within the environment, and thus the shared map may dynamically change as new data is added to any individual map, once that new data is shared. Map 448 is shown as a contiguous map, but in other examples, the shared map may have regions of discontinuity.

In one example, map sharing may be triggered by one wearable spatial audio output device signaling to other wearable spatial audio output devices that a shared experience is about to commence. The signaling device may provide map data to the other devices, and may indicate the location of one or more dynamic audio objects on the map (e.g., a display screen).

At 520, method 500 includes receiving a user-specific subset of audio tracks based on one or more user-specific parameters. As described with regard to FIG. 3, the user-specific subset may be based on user-preferences, available options, wearable spatial audio output device configuration, etc.

In some examples, the user-specific subset of audio tracks may include audio tracks associated with one or more dynamic audio objects and exclude audio tracks associated with other dynamic audio objects. For example, the subset of audio tracks for a dynamic audio object may include tracks with may be selected or de-selected based on user preferences.

In some examples, one or more audio tracks associated with a dynamic audio object may be selected based on shared map data. As an example, FIG. 4A illustrates secondary dynamic audio objects 450, 452, and 454, which may be virtual objects such as animals, aliens, etc., virtual video screens, virtual speakers, etc. Secondary dynamic audio object 450 is placed behind user 412. As such, audio tracks for secondary dynamic audio object 450 may not be selected for inclusion in a subset of audio tracks for user 412, as user 412 is not looking at secondary dynamic audio object 450. Secondary dynamic audio object 452 is placed between users 412 and 414. As such, one or more audio tracks for secondary dynamic audio object 452 may be selected for inclusion in a subset of audio tracks for both users 412 and 414. Secondary dynamic audio object 454 is placed proximal to user 414 within second map 444. As second map 444 is shared with user 412, both users may perceive secondary dynamic audio object 454 and one or more audio tracks for secondary dynamic audio object 452 may be selected for inclusion in a subset of audio tracks for both users 412 and 414. In some examples, different audio tracks for a secondary dynamic audio object may be selected for each user using the shared map data, e.g., based on position within the environment, orientation, head orientation/gaze direction, etc.

Both primary and secondary dynamic audio objects may be configured to apparently emit audio from an arbitrary position in space, which may change over time. As such, audio tracks for a dynamic audio object that are selected for inclusion in a user's subset of audio tracks may change over time based on the position of the user, other users, or the position of the dynamic audio object itself.

At 530, method 500 includes, generating, based on the shared mapping data, a device-specific spatialized audio mix including the user-specific subset of audio tracks for synchronous playback at each wearable spatial audio output device. As described with regard to FIG. 3, the device-specific spatialized audio mix may be generated by coding and filtering the audio tracks. Generating each device-specific spatialized audio mix may be based on shared map data, including environmental characteristics, user position within the environment, user position relative to dynamic audio objects, user position relative to other users, etc.

By using the shared map data, each device-specific spatialized audio mix may allow for game sounds to be presented as positions in space, corresponding to positions on the shared map. Each mix may be updated based on user positions in the environment, positions of the dynamic audio objects in the environment, etc. This enables each user to experience a personalized, spatialized sound mix specific to where the user is and what they are looking at within the environment.

As described with regard to FIG. 3, synchronous initiation of playback of the device-specific spatialized audio mixes at each wearable spatial audio output device may be initiated based on user input, by receiving a signal from another device, etc. In other examples, initiation of playback may occur on each device separately and synchronized based on a clock signal, time-stamp, etc.

Once playback has been initiated, the device-specific spatialized audio mixes may be updated, for example based on updated shared map data. As described above, the shared map may be expanded as users move about the shared space. Indeed, a single user moving about the environment may expand the shared map for all users.

As shown in FIG. 4B, both user 412 and user 414 have moved from their original positions in FIG. 4A. As a result, first map 440 and second map 444 have expanded, and thus shared map 448 has expanded. User 412 is now in a position to view secondary dynamic audio object 450. As such, audio tracks associated with secondary dynamic audio object 450 may be added to the user-specific subset of audio tracks for user 412, and may be included in the generated device-specific spatial audio mix for wearable spatial audio device 416.

In comparison, user 414 has left room 402 and entered room 404. As such, user 414 is no longer able to view secondary dynamic audio objects 452 and 454, and audio tracks associated with secondary dynamic audio objects 452 and 454 may be removed from the user-specific subset of audio tracks for user 414.

In FIG. 4B, user 414 has approached a secondary dynamic audio object 460 within room 440. Secondary dynamic audio object 460 may be an object that was discovered and unlocked by user 414 during game play. In other examples, such as when shared map 448 is obtained from a central server, secondary dynamic audio object 460 may have been constantly accessible throughout game play. Accordingly, audio tracks associated with secondary dynamic audio object 460 may be added to the user-specific subset of audio tracks for user 414, and may be included in the generated device-specific spatial audio mix for wearable spatial audio device 418. Depending on the nature of secondary dynamic audio object 460, user 412 may also be able to perceive secondary dynamic audio object 460. For example, user 414 unlocking secondary dynamic audio object 460 may unlock audio tracks for all users on shared map 448. Audio tracks associated with secondary dynamic audio object 460 may be added to the user-specific subset of audio tracks for user 412, and the audio tracks added to device-specific spatial audio mix for wearable spatial audio device 416, albeit attenuated for environmental characteristics, such as wall 406 and door 408.

As another example, a common, shared map of an environment may enable multiple users to interact with a plurality of dynamic audio objects, such as at a museum. Users may select preferences for audio playback, and trigger sounds, narration, etc. when approaching exhibits. Groups of users may enjoy shared, synchronized experiences within the framework of their own user preferences. By placing the entire museum on a shared map, sounds from one end of the museum may be presented as attenuated to users on the other end of the museum. Further, a group member may discover an exhibit and share spatialized audio with other group members.

Figure 6:
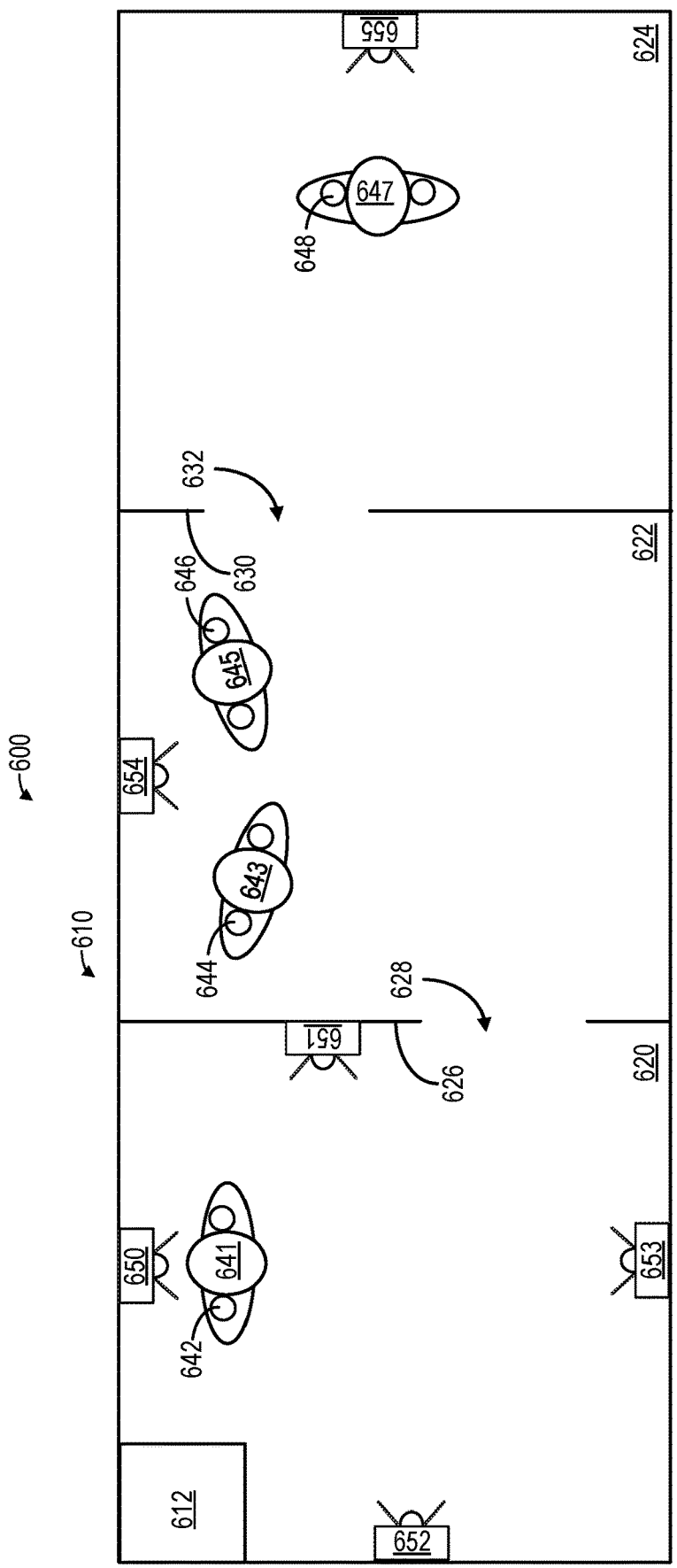
FIG. 6 shows a schematic depiction of an example use environment for presenting spatialized audio to two or more users based on a shared map.

FIG. 6 shows a schematic depiction of an example use environment 600 for presenting spatialized audio to two or more users based on a shared map. In this example, use environment 600 is configured as a multi-room museum, though such a use environment may take any suitable form. Environment 600 includes a spatial audio system 610, and a sensor system 612. Environment 600 includes a first room 620, a second room 622, and a third room 624. First room 620 and second room 622 are separated by wall 626 and connected by door 628. Second room 622 and third room 624 are separated by wall 630 and connected by door 632. Although depicted as being placed within first room 620, sensor system 612 may include componentry throughout environment 600.

Four users are depicted within environment 600. User 641 is depicted in first room 620 with wearable spatial audio output system 642. User 643 is depicted in second room 622 with wearable spatial audio output system 644. User 645 is depicted in second room 622 with wearable spatial audio output system 646, and user 647 is depicted in third room 624 with wearable spatial audio output system 648. A plurality of dynamic audio objects (650-655) are shown throughout environment 600. Dynamic audio objects 650-655 may be audio associated with exhibits, such as dinosaur roars, bird calls, exhibit narration, museum directions, field recordings, etc.

Spatial audio system 610 may manage map data for environment 600. Each point within environment 600 may be correlated with a grid point within the map data, for example. As such, a 3-dimensional grid of environment 600 may include the location of walls, doors, exhibits, and other stationary objects. The map data may further include transient and/or mobile objects within environment 600. For example, users entering environment 600 may be tracked and added to the map data. Users with wearable spatial audio output devices or other mobile devices capable of generating map data may feed data back to spatial audio system 610 in order to update and/or enhance the map data. The map data may include shared map data. In this way, two or more users may share their positions, audio tracks, etc. within environment 600. Such sharing may be selective. For example, a group of classmates may share with each other, but may not share with other museum patrons not in their group.

The map data for environment 600 may be used to place dynamic audio objects (650-655) at specific locations within environment 600, such as at specific exhibits. Each dynamic audio object may be associated with a plurality of audio tracks, as described above. Each dynamic audio object may be associated with criteria in order to initiate playback. For example, some dynamic audio objects may initiate playback based on user proximity. In such an example, as user 642 approaches dynamic audio object 650, and reaches a position within a threshold of dynamic audio object 650, narration about the associated exhibit may begin. In some examples, playback may be based on the orientation of user 642 to dynamic audio object 650. Playback may only begin when user 642 is looking directly at object 650, and may end when user 642 looks away from object 650.

In some examples, multiple audio tracks may be triggered as user 642 approaches dynamic audio object 650, for example, narration and active display sounds (e.g., nature sound tracks). As user 642 peruses the other dynamic audio objects within first room 620 (e.g., dynamic audio objects 651, 652, & 653), the narration track may be attenuated, but the nature sounds tracks may be maintained in the spatialized audio mix provided by wearable spatial audio output device 642. In some examples, user 642 may trigger numerous audio tracks from one or more dynamic audio objects using gesture cues, gaze cues, positional cues, etc.

In FIG. 6, both user 643 and user 645 are oriented towards dynamic audio object 654. As described with regard to FIG. 6, the two users may have their own user-preferences, and thus may receive a different subset of tracks while viewing the dame exhibit. For example, user 643 and user 645 may select narration with different languages, different emphasis, different age-appropriate material, etc. Initiation of playback may be triggered when both users are within a threshold of the exhibit. Users may select other members of a family or group with whom to synchronize playback. In some examples, one user may trigger additional audio tracks that may be shared and synchronized with others viewing the same exhibit or may only be presented to that user.

Some dynamic audio objects may be associated with a visual component, such as a video screen, animation, and animatronic device, etc. Audio changes associated with visual cues may be presented to each user at the same time. For groups at an exhibit, visual accompaniment could delay initiation until all members of a group are within a threshold distance of the dynamic audio object and/or are oriented towards the dynamic audio object.

In other examples, some dynamic audio objects may be associated with live, scheduled events, such as a live exhibit schedule. For example, user 647 is depicted viewing dynamic audio object 655, which may be associated with an animated dinosaur exhibit. The exhibit may loop every duration, for example, every hour. As such, user 647 may receive the audio tracks associated with dynamic audio object 655 when in proximity to the exhibit, but will not have control over when the audio playback starts.

In some examples, user 647 may be able to share sounds of dynamic audio object 655 with their other group members, even if they are not proximal to the exhibit. For example, user 647 may share dinosaur sounds with user 642. User 642 may perceive these sounds as presented spatially and attenuated for distance, for walls 626 and 630, etc. In this way, a user may in effect invite their group members to join them at an exhibit, or otherwise alert them to an exhibit. Using shared map data may also help group members find each other within environment 600. For example, a virtual bell may be placed on a child so their parents may track them audibly. For prime exhibits, spatialized sounds may be shared among all users within the environment, for example, heralding the start of a dinosaur animation.

Figure 7:
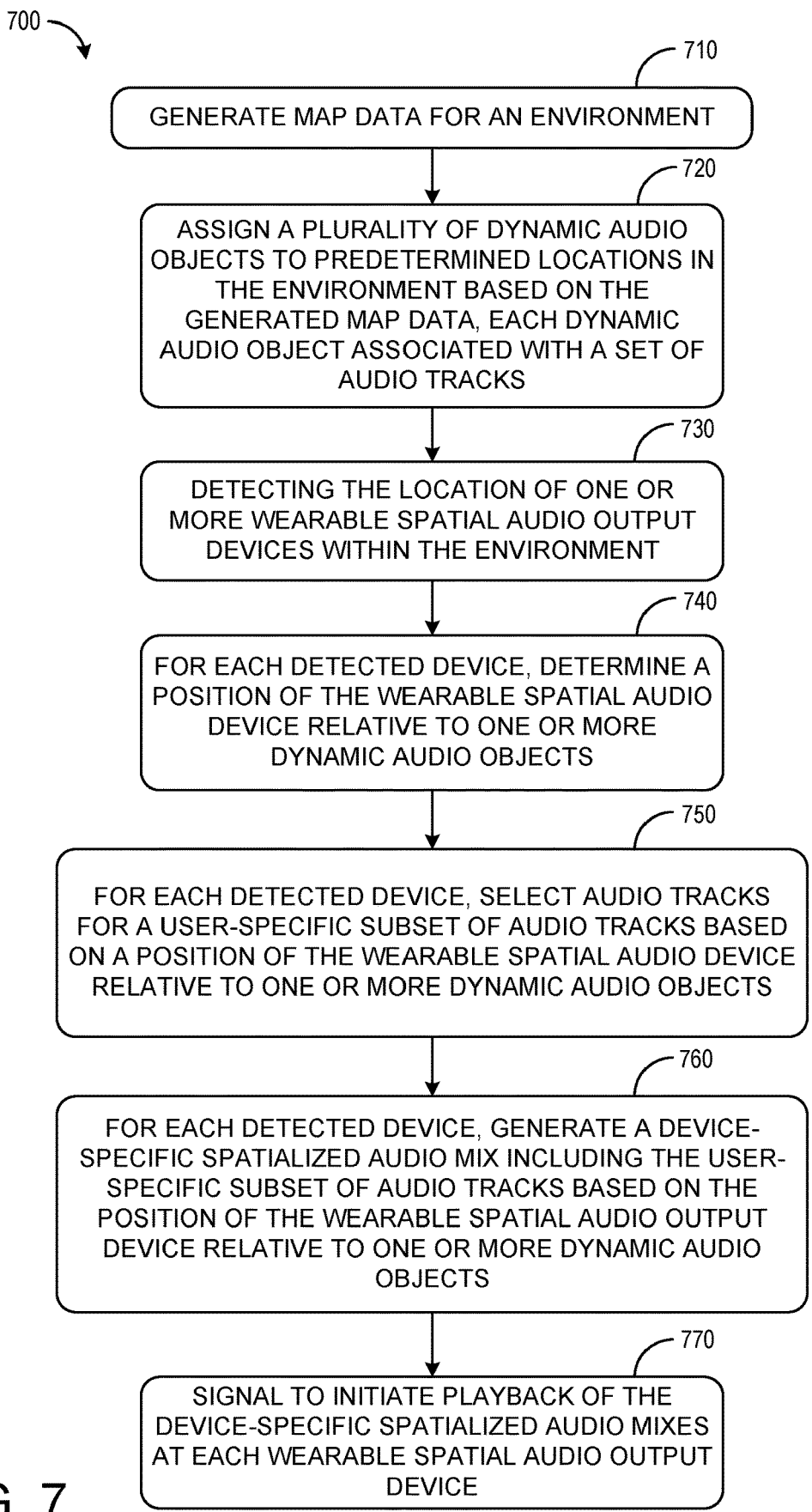
FIG. 7 shows an example method for presenting spatialized audio to two or more users within an environment with shared map data.

FIG. 7 depicts an example method 700 for presenting spatialized audio to two or more users within an environment with shared map data, such as environment 600 depicted in FIG. 6. Method 700 may enable multiple users to share a common map of an environment in order to render a shared spatial audio experience. In one example, method 700 may enable multiple users to experience a museum with multiple exhibits in a way that is individualized yet shared.

At 710, method 700 includes generating map data for the environment. Map data may be generated using one or more depth cameras, mobile devices, etc. as described with regard to FIG. 5. Map data may be stored in a way that it may be shared with one or more other devices, and may be updated dynamically as the environment changes.

At 720, method 700 includes assigning a plurality of dynamic audio objects to predetermined locations in the environment based on the generated map data, each dynamic audio object associated with a set of audio tracks. For example, each dynamic audio object may be assigned an address based on the map data. The address may be associated with a static object, a dynamic object, a display screen, etc. However, the dynamic audio object need not be a tangible object in and of itself. Rather the dynamic audio object may represent a virtual speaker or set of speakers.

At 730, method 700 includes detecting the location of one or more wearable spatial audio output devices within the environment. Detecting the location of one or more wearable spatial audio output devices may include communicatively connecting to the device, visually detecting the device, detecting the device via one or more sensors, etc.

At 740, method 700 includes, for each detected device, determining a position of the wearable spatial audio output device relative to one or more dynamic audio objects. This may include determining a position of the wearable spatial audio output device based on the common map data, and comparing the position of the wearable spatial audio output device to the known positions of one or more dynamic audio objects.

At 750, method 700 includes, for each detected device, selecting audio tracks for a user-specific subset of audio tracks based on the position of the wearable spatial audio output device relative to one or more dynamic audio objects. As described with regard to FIG. 3, the user-specific subset may be based on user-preferences, available options, wearable spatial audio output device configuration, etc. and may be further based on proximity, orientation, gaze, as regards the dynamic audio objects.

At 760, method 700 includes, for each detected device, generating a device-specific spatialized audio mix including the user-specific subset of audio tracks based on the position of the wearable spatial audio output device relative to one or more dynamic audio objects. As described with regard to FIG. 3, the device-specific spatialized audio mix may be generated by coding and filtering the audio tracks. Generating each device-specific spatialized audio mix may be based on common map data, including environmental characteristics, user position within the environment, user position relative to dynamic audio objects, user position relative to other users, etc.

At 770, method 700 includes, for each detected device, signaling to initiate playback of the device-specific spatialized audio mix. In some examples, initiating playback may include synchronously initiating playback of device-specific spatialized audio mixes across two or more wearable spatial audio output devices.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
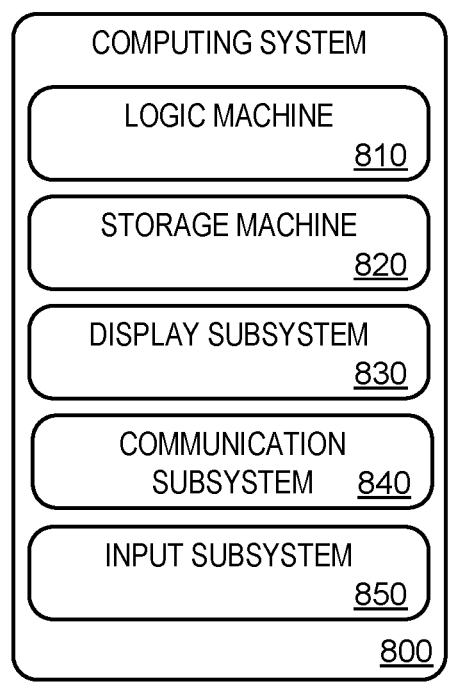
FIG. 8 schematically shows an embodiment of a computing system.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic machine 810 and a storage machine 820. Computing system 800 may optionally include a display subsystem 830, input subsystem 840, communication subsystem 850, and/or other components not shown in FIG. 8.

Logic machine 810 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 820 includes one or more physical devices configured to hold instructions executable by the logic machine to implement the methods and processes described herein. When such methods and processes are implemented, the state of storage machine 820 may be transformed—e.g., to hold different data.

Storage machine 820 may include removable and/or built-in devices. Storage machine 820 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 820 may include volatile, nonvolatile, dynamic, static, read/write, read-only, random-access, sequential-access, location-addressable, file-addressable, and/or content-addressable devices.

It will be appreciated that storage machine 820 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 810 and storage machine 820 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 830 may be used to present a visual representation of data held by storage machine 820. This visual representation may take the form of a graphical user interface (GUI). As the herein described methods and processes change the data held by the storage machine, and thus transform the state of the storage machine, the state of display subsystem 830 may likewise be transformed to visually represent changes in the underlying data. Display subsystem 830 may include one or more display devices utilizing virtually any type of technology. Such display devices may be combined with logic machine 810 and/or storage machine 820 in a shared enclosure, or such display devices may be peripheral display devices.

When included, input subsystem 840 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 850 may be configured to communicatively couple computing system 800 with one or more other computing devices. Communication subsystem 850 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

In one example, a wearable spatial audio output device comprises one or more audio speakers; one or more processors; and a storage machine holding instructions executable by the one or more processors to: obtain map data for a real-world environment including one or more dynamic audio objects; obtain a device-specific subset of audio tracks and a device-specific spatialized audio mix of the device-specific subset of audio tracks based on the map data; receive an indication of a change in an environmental condition relative to one or more of the dynamic audio objects; and adjust the device-specific spatialized audio mix based on the change in the environmental condition. In such an example, or any other example, the wearable spatial audio output device may additionally or alternatively comprise one or more sensors, and the storage machine additionally or alternatively holds instructions executable by the one or more processors to: generate the map data based on data received via one or more sensors of the spatial audio device. In any of the preceding examples, or any other example, the indication of the change in the environmental condition is additionally or alternatively based at least upon data received at one more image sensors. In any of the preceding examples, or any other example, the indication of the change in the environmental condition is additionally or alternatively based at least upon data received at one more acoustic sensors. In any of the preceding examples, or any other example, the change in the environmental condition additionally or alternatively comprises a change in the acoustic properties of the real-world environment. In any of the preceding examples, or any other example, the change in the environmental condition additionally or alternatively comprises a change in the occupancy of the real-world environment. In any of the preceding examples, or any other example, receiving an indication of a change in an environmental condition additionally or alternatively comprises obtaining updated map data for the real-world environment. In any of the preceding examples, or any other example, the one or more dynamic audio objects additionally or alternatively includes a real-world object located at a position within the real-world environment and associated with a set of audio tracks. In any of the preceding examples, or any other example, the one or more dynamic audio objects additionally or alternatively includes a virtual object located at a position within the real-world environment and associated with a set of audio tracks.

In another example, one or more computer-readable media have computer-readable instructions thereon which, when executed by one or more processors, cause the one or more processors to: obtain map data for a real-world environment including one or more dynamic audio objects; obtain a device-specific subset of audio tracks and a device-specific spatialized audio mix of the device-specific subset of audio tracks based on the map data; receive an indication of a change in an environmental condition relative to one or more of the dynamic audio objects; and adjust the device-specific spatialized audio mix based on the change in the environmental condition. In such an example, or any other example, the computer-readable media additionally or alternatively have instructions thereon, which, when executed by one or more processors, cause the one or more processors to generate the map data based on data received via one or more sensors of a spatial audio device. In any of the preceding examples, or any other example, the instructions are additionally or alternatively executable to receive the indication of the change in the environmental condition based on data received at one more image sensors. In any of the preceding examples, or any other example, the instructions are additionally or alternatively executable to receive the indication of the change in the environmental condition based on data received at one more acoustic sensors. In any of the preceding examples, or any other example, the instructions are additionally or alternatively executable to receive the indication of the change in the environmental condition are executable to receive an indication of a change in the acoustic properties of the real-world environment. In any of the preceding examples, or any other example, the instructions are additionally or alternatively executable to receive the indication of the change in the environmental condition are executable to receive an indication of a change in the occupancy of the real-world environment. In any of the preceding examples, or any other example, the instructions are additionally or alternatively executable to receive the indication of the change in an environmental condition are executable to obtain updated map data for the real-world environment. In any of the preceding examples, or any other example, the one or more dynamic audio objects additionally or alternatively includes a real-world object located at a position within the real-world environment and associated with a set of audio tracks. In any of the preceding examples, or any other example, the one or more dynamic audio objects additionally or alternatively includes a virtual object located at a position within the real-world environment and associated with a set of audio tracks.

In yet another example, a method for a wearable spatial audio device comprises obtaining map data for a real-world environment including one or more dynamic audio objects; obtaining a device-specific subset of audio tracks and a device-specific spatialized audio mix of the device-specific subset of audio tracks based on the map data; receiving an indication of a change in an environmental condition relative to one or more of the dynamic audio objects; and adjusting the device-specific spatialized audio mix based on the change in the environmental condition. In such an example, or any other example, obtaining the map data additionally or alternatively comprises generating the map data based on data received via one or more sensors of the spatial audio device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A spatial audio output device, comprising:
one or more audio speakers;
a communication subsystem;
a logic machine; and
a storage machine holding instructions executable by the logic machine to:
receive, via the communication subsystem, a device-specific subset of audio tracks for a dynamic audio object in an environment, wherein the device-specific subset of audio tracks are received as a stream from a server;
receive, via the communications subsystem, a synchronizing signal indicating a timing of audio playback initiation; and
initiating playback of the device-specific subset of audio tracks based on the synchronizing signal.

2. The spatial audio output device of claim 1, wherein the spatial audio output device is a wearable device.

3. The spatial audio output device of claim 1, wherein the synchronizing signal is received from another spatial audio output device.

4. The spatial audio output device of claim 1, wherein the device-specific subset of audio tracks is based are based on a location of the spatial audio output device relative to the dynamic audio object in the environment.

5. The spatial audio output device of claim 1, wherein the device-specific subset of audio tracks includes audio tracks for the dynamic audio object and excludes audio tracks for other dynamic audio objects in the environment.

6. The spatial audio output device of claim 1, wherein the instructions are further executable by the logic machine to:
access device playback capabilities;
receive a user preference relating to a language; and
wherein the device-specific subset of audio tracks is based on the playback capabilities and the language.

7. The spatial audio output device of claim 1, further comprising a near-eye, see-through display.

8. A system for presenting spatialized audio to two or more users within an environment, the system comprising:
a logic machine; and
a storage machine comprising instructions executable by the logic machine to:
communicatively connect to two or more spatial audio output devices;
for each spatial audio output device communicatively connected to the system:
generate, from a set of audio tracks for one or more dynamic audio objects positioned within the environment, a device-specific subset of audio tracks;
generate, based upon a location of the spatial audio output device relative to the one or more dynamic audio objects positioned within the environment, a device-specific spatialized audio mix including the device-specific subset of audio tracks;
send the device-specific spatialized audio mix to the spatial output audio device;
receive a trigger signal indicating to initiate playback at each spatial output audio device; and
based on the trigger signal, synchronously signal to initiate playback of the device-specific spatialized audio mixes at each spatial audio output device.

9. The system of claim 8, wherein the spatial audio output devices are wearable spatial audio output devices.

10. The system of claim 8, wherein the device-specific subset of audio tracks are based on playback capabilities of the particular spatial audio output device for which the device-specific subset of audio tracks are generated.

11. The system of claim 8, wherein the trigger signal is received from the respective spatial audio output device.

12. The system of claim 8, wherein the trigger signal is generated by the system.

13. The system of claim 8, wherein the device-specific spatialized audio mix is based on playback capabilities of the respective device.

14. The system of claim 8, wherein synchronously signaling to initiate playback causes playback of the device-specific spatialized audio mix to be synchronized with playback of a visual component of the dynamic audio object.

15. A computer-implemented method for presenting spatialized audio to two or more users within an environment, the method comprising:
communicatively connecting, by a server, to a first wearable spatial audio device and a second wearable spatial audio device;
generating, by the server, from a set of audio tracks for one or more dynamic audio objects positioned within the environment, a device-specific subset of audio tracks;
generating, based upon a location of a first wearable spatial audio output device relative to the one or more dynamic audio objects positioned within the environment, a first device-specific spatialized audio mix including the device-specific subset of audio tracks;
generating, based upon a location of a second wearable spatial audio output device relative to the one or more dynamic audio objects positioned within the environment, a second device-specific spatialized audio mix including the device-specific subset of audio tracks;
sending, by the server, the first device-specific spatialized audio mix to the first wearable spatial output audio device;
sending, by the server, the second device-specific spatialized audio mix to the second wearable spatial output audio device; and
synchronously signaling the first wearable spatial output audio device and the second wearable spatial output audio device to cause synchronous playback of the first device-specific spatialized audio mix and the second device-specific spatialized audio mix.

16. The method of claim 15, further comprising:
receiving a change in environment indication from the first wearable spatial output audio device;
based on the change in environment indication, generating an adjusted first device-specific spatialized audio mix; and
sending the adjusted first device-specific spatialized audio mix to the first wearable spatial output audio device.

17. The method of claim 15, further comprising:
receiving at least one of a gaze indication or a focus indication from the first wearable spatial output audio device;

based on the at least one of the gaze indication or the focus indication, generating an adjusted first device-specific spatialized audio mix; and sending the adjusted first device-specific spatialized audio mix to the first wearable spatial output audio device.

18. The method of claim 15, wherein:

the first device-specific spatialized audio mix is generated based on playback capabilities of the first wearable spatial output audio device; and the second device-specific spatialized audio mix is generated based on playback capabilities of the second wearable spatial output audio device.

19. The method of claim 15, further comprising:

receiving a first user-preferred language from the first wearable spatial output audio device, wherein the generated first device-specific spatialized audio mix is in the first user-preferred language; and receiving a second user-preferred language from the second wearable spatial output audio device, wherein the generated second device-specific spatialized audio mix is in the second user-preferred language.

20. The method of claim 15, synchronously signaling the first wearable spatial output audio device and the second wearable spatial output audio device occurs based on the first wearable spatial output audio device and the second wearable spatial output audio device being within a threshold distance of the one or more dynamic audio objects.

* * * * *